US010341400B2

(12) United States Patent
La Barrie et al.

(10) Patent No.: US 10,341,400 B2
(45) Date of Patent: Jul. 2, 2019

(54) SYSTEM AND METHOD FOR SIGNAL AND DATA ROUTING

(71) Applicant: Simeon La Barrie, San Clemente, CA (US)

(72) Inventors: Simeon La Barrie, San Clemente, CA (US); Rajeev Dujari, San Francisco, CA (US)

( * ) Notice: Subject to any disclaimer, the term of this patent is extended or adjusted under 35 U.S.C. 154(b) by 467 days.

(21) Appl. No.: 15/326,421

(22) PCT Filed: Sep. 9, 2013

(86) PCT No.: PCT/US2013/058787
§ 371 (c)(1),
(2) Date: Jan. 13, 2017

(87) PCT Pub. No.: WO2014/185942
PCT Pub. Date: Nov. 20, 2014

(65) Prior Publication Data
US 2017/0201555 A1    Jul. 13, 2017

Related U.S. Application Data

(60) Provisional application No. 61/823,862, filed on May 15, 2013.

(51) Int. Cl.
| *H04L 12/18* | (2006.01) |
| *H04L 29/06* | (2006.01) |
| *G06Q 10/10* | (2012.01) |
| *G06Q 30/06* | (2012.01) |

(52) U.S. Cl.
CPC ........ *H04L 65/4061* (2013.01); *G06Q 10/10* (2013.01); *G06Q 30/0613* (2013.01); *H04L 12/1818* (2013.01); *H04L 12/1827* (2013.01); *H04L 65/1069* (2013.01); *H04L 65/403* (2013.01)

(58) Field of Classification Search
None
See application file for complete search history.

(56) References Cited

U.S. PATENT DOCUMENTS

| 8,330,798 B2 * | 12/2012 | Hwang | G06T 17/00 348/42 |
| 2006/0004690 A1 * | 1/2006 | Beartusk | G06Q 10/10 |
| 2006/0062367 A1 * | 3/2006 | Christenson | G06Q 10/1095 379/202.01 |
| 2009/0094367 A1 * | 4/2009 | Song | H04L 12/1818 709/227 |

(Continued)

*Primary Examiner* — Joshua Joo
(74) *Attorney, Agent, or Firm* — Eandi Fitzpatrick LLP; William Fitzpatrick, Esq.

(57) ABSTRACT

The present invention relates generally to data and signal routing. More particularly, the present invention relates to certain new and useful advances in invitation routing for conference sessions, of which the following is a specification, reference being had to the drawings accompanying and forming a part of the same. Conferencing through various forms of media has rapidly evolved in the last few decades, particularly due to the introduction of low-cost, high-capacity communications networks. Videoconferencing and videophone calling, in particular, have made significant strides due in part to the development of tablet computers and smart phones, but also globalization of the market.

7 Claims, 2 Drawing Sheets

(56) References Cited

U.S. PATENT DOCUMENTS

| | | | | |
|---|---|---|---|---|
| 2009/0135743 A1* | 5/2009 | Kowalewski | ........... | H04M 3/56 370/261 |
| 2011/0137973 A1* | 6/2011 | Wei | .................... | H04L 67/1008 709/202 |
| 2013/0007212 A1* | 1/2013 | Orr | ................... | G06F 17/30902 709/217 |
| 2013/0041953 A1* | 2/2013 | Renner | ............. | H04M 3/42365 709/204 |
| 2014/0139614 A1* | 5/2014 | Swanson | ................ | H04N 7/152 348/14.08 |

* cited by examiner

SYSTEM AND METHOD FOR SIGNAL AND DATA ROUTING

CROSS-REFERENCE TO RELATED APPLICATIONS

The present Utility Patent Application claims the priority benefit of the US provisional application for patent Ser. No. 61/823,862 filed on May 15, 2013, entitled System and Method for Signal and Data Routing for Connecting Users, under 35 USC 119(e). The contents of this related provisional application are incorporated herein by reference for all purposes.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Conferencing through various forms of media has rapidly evolved in the last few decades, particularly due to the introduction of low-cost, high-capacity communications networks.

Video conferencing and videophone calling, in particular, have made significant strides due in part to the development of tablet computers and smart phones, but also globalization of the market. With increasing travel costs, businesses and organizations have turned to conferencing to save on expenditures and/or increase contact. Interpreted broadly, a conference may be viewed as a construct for organizing related interpersonal communications over a communications network.

Generally, in these networked settings, such as over the Internet or local area networks, conferences take place between multiple parties or users using audio and/or video and/or feeds. In a conventional system, users may be invited to, or join a conference via the user's identifier (or alias thereof). An organizer of the conference may invite other users, who may be viewed as "participants" in a conference. A participant may have a persistent identity that is authenticated, or, optionally, may be permitted to join the conference without software authentication of his identity. In either case, participants may be assigned privileges and are authorized to effect various changes to the state associated with the conference. Conferences may be either non-authenticated, or include at least one authenticated participant.

In a purely non-authenticated conference, each user participant may join the conference based on the conference identifier (or alias thereof), without a user identity being checked by a server. Each user may receive an alphanumeric pass-code that determines the role of the participant within the conference session, and each role is authorized with a set of privileges to effect changes to the conference. Pass-codes may be unique to a user or shared by multiple users. User participants with a conference identifier or pass-code may join a conference through self-identification. For example, non-authenticated participants may be initially placed on hold in a conference lobby until their identity can be verified by ad-hoc means by the other participants. Optionally, non-authenticated participants may be admitted directly to the conference session, leaving it up to authorized participants to notice the non-authenticated participant, and decide whether that participant is a welcome guest versus an undesired intruder who should be ejected from the conference session.

In an authenticated conference, on the other hand, a user identity may be checked by a server. Many of today's authenticated conferencing systems are consumer-to-consumer oriented and use a flat namespace, meaning that user identities are peers to one another. In these circumstances, there is no way to determine strictly from the identity whether any two users are members of the same organization, such as a business entity, civic association, or family for example. For example, in a typical Customer Relationship Management (CRM) system, a consumer who initiates contact with the business is connected to the next available representative. Both the consumer and call representative spend time authenticating the consumer and locating the account. Beyond the consumer possibly selecting the appropriate department through voice menu prompts, neither the consumer nor the target organization has any influence on routing the consumer to the best representative for them.

In an authenticated conference, as shown with reference to FIG. 1, a known system for conferencing over a network is shown generally at reference numeral 100. In said system 100, user agents 102 and 108 (herein referred to as "UAs") are coupled to a conferencing server 104.

In step S-1, the user agent contacts the conferencing server 104 to sign in, as well as periodically update presence information. In step S-2, the user agent 102 creates a new conference session or joins an existing one. Additional invited users that received the appropriate pass-code/credentials may similarly have their UAs join the conference session.

In step S-3, a UA 102 signals the conferencing server 104 to contact a user by name. In this circumstance, the conferencing server 104 checks the presence information for the invited user to locate a previously signed-in UA for that invited user. The conference session is terminated by a user authorized to do so, or when the last such authorized the user departs the conference session. If a suitable UA is located, the conferencing server 104 contacts the UA in order to have that UA 108 join the session. If no suitable UA is located or the invited user declines to join, the invite request in S-3 is terminated with appropriate message back to the initiating UA 102.

The above-described system has many shortcomings for an individual contacting an organization, including but not limited to: The initiating user must explicitly invite each desired user in the target organization one at a time; the initiating user must either check for presence of their specific target and/or wait to see if an invite is successful; the target organization does not automatically maintain history including past contacts; the target organization has no ability to influence the routing based on history of that user's contact with the target organization as well as that user's own preferences; and the target organization does have insight into the general reputation of the initiating user based on his past contacts with similar organizations.

As such, these known systems are not suitable for organizing the proper hierarchies and constructs on an organization level, particularly with relation to business-to-consumer and business-to-business interactions. Presently, no suitable system and method for invitation routing for conference sessions exists.

SUMMARY OF THE INVENTION

The following summary of the invention is provided in order to provide a basic understanding of some aspects and features of the invention. This summary is not an extensive overview of the invention, and as such, is not intended to particularly identify key or critical elements of the invention or to delineate the scope of the invention. Its sole purpose is to present some concepts of the invention in a simplified form as a prelude to the more detailed description that is presented below.

Various embodiments of the subject invention provide a system and method for invitation routing for conference sessions which enables an organization to route signals and/or data based on the contextualized data about a user and the organizations preferences or needs. The present invention provides advantages over the known systems in that it allows an organization to introduce user context into a routing systems so as to route communication from the user to the best matched organizational representative(s), taking into account both the user's and the target organization's preferences. In this way, the organization is better able to maintain and build a relationship with consumers, bringing together a dissociated set of interactions across different representatives of the same organization.

In an exemplary embodiment, the system and method provides an organization the ability to qualify and serve users more efficiently, as the organization is better able to recognize legitimate, qualified users, and make purchase with greater speed and ease to the consumer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
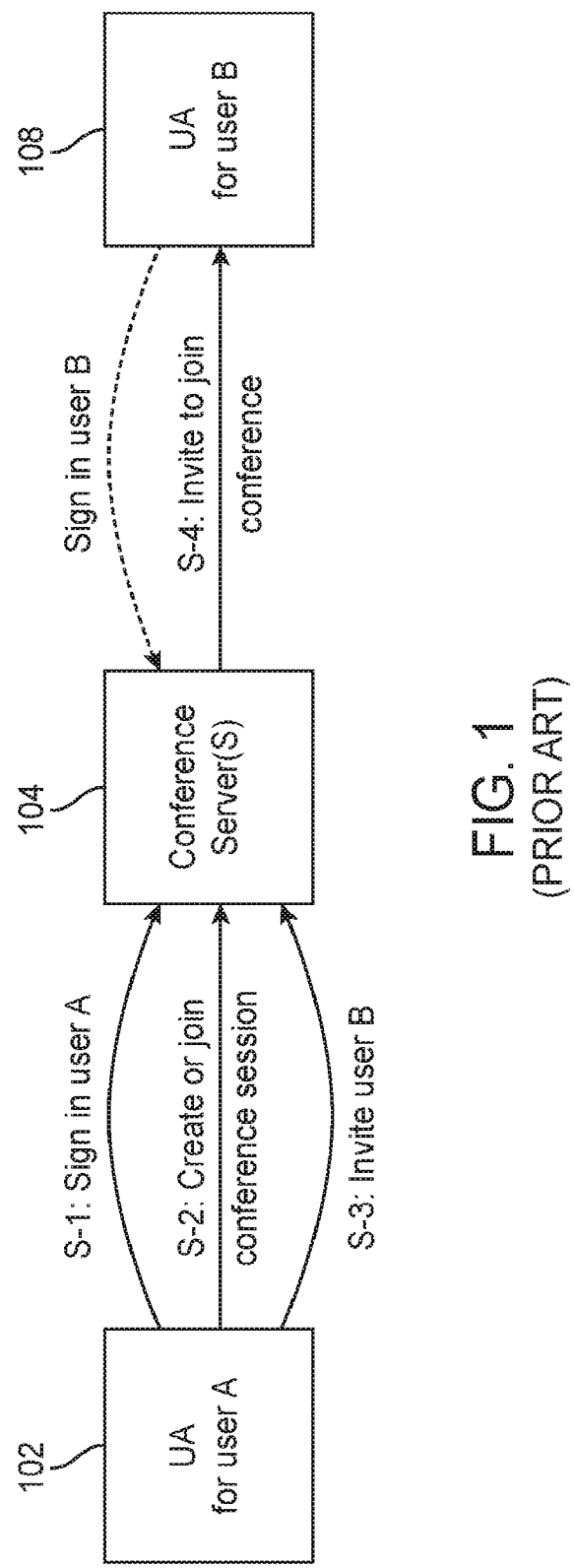
FIG. 1 is a known system for invitation routing for conference session

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

"Conference" and "conferencing", as used herein, may take place between multiple users parties and may occur in any known media type. Non-limiting examples of media types include audios, videos, pictures, images and textual information. Additional information may be attached or linked to the media for purposes of furthering the interaction between the parties. Non-limiting examples of additional information which may be attached or linked include videos, audios and text.

In the processor based system and method of the present invention, a plurality of users may log on to the client side website, through for example, a graphical user interface on a device such as a personal computer, tablet computer, or mobile phone. The user agent may communicate with one or more servers for example, that comprises, amongst other features, one or more CPUs, microprocessors, RAM/ROM, mass data storage for personal attributes and stored files and like. Tasks performed by a server may be distributed to multiple software processes on multiple computers, and a skilled practitioner to optimize speed, scale, cost efficiency, and/or reliability by refactoring server configurations and roles. It will be understood by those skilled in the art that communication systems may take many different forms including local area networks (LANs), wide area networks (WANs), wired telephone networks, wireless networks, or any other network supporting data communication between respective entities.

The present invention will now be described in detail with reference to embodiments thereof as illustrated in the accompanying drawings.

Figure 2:
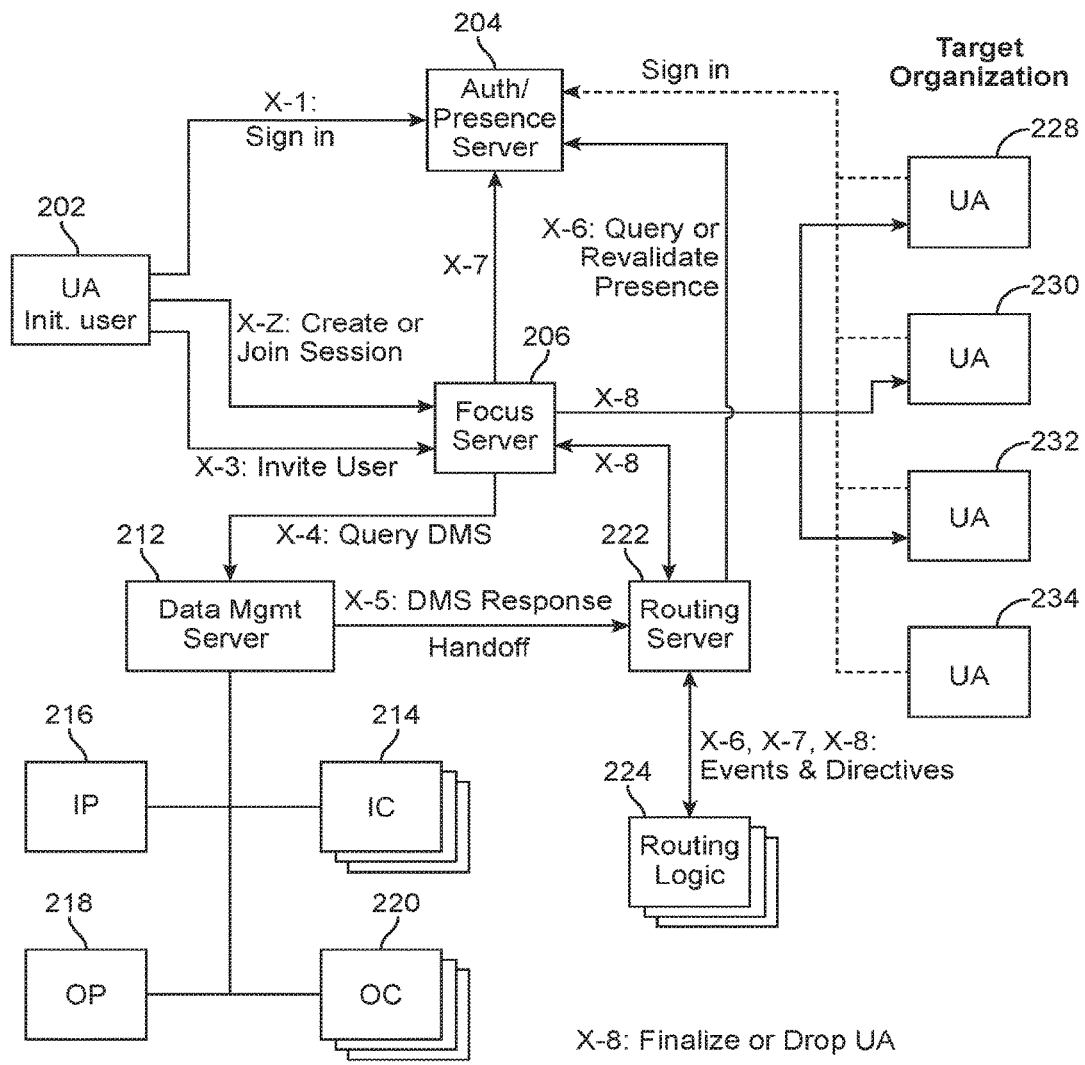
FIG. 2 is a combination block and step-wise diagram applicable to embodiments of the present invention.

Referring to FIG. 2, a block diagram together with a step-wise diagram depicting a processor based method and system which operates over a network, such as a global network or LAN, for example, shown generally at 200. As shown, a UA 202 may be coupled to an authentication server 204. The user agent may sign in, step X-1, through communication with the authentication server 204. The authentication server 204 may be configured to verify the user's identity upon UA sign-in, and maintain a presence state for the user.

The user agent 202 may be further coupled to a focus server 206. The focus server 206 may be configured to allow the UA 202 to create a new conference session or join existing session and manage joining of other UAs, among other server functions. The focus server 206 may be further configured to receive join requests from UAs who have received an invitation URL or other token that permits them to join the session. Additionally, a UA 202, on behalf of the initiating user once joined to the session may invite another user to join. In this circumstance, the focus server 206 may be further configured to directly query the presence information of that user and then be communicatively coupled with one or more of their UAs. Additional invited users may have one or more user agents join or exit the session in any order via invite functions, step X-3, until the session is later terminated either by an authorized user or when the last authorized user agent exits the conference.

A participant in an authenticated conference, if so authorized, may cause a user to be connected or bridged into the session though focus server 206, which is further coupled to authentication server 204. In this way, when a user agent 202 invites a target from an organization 210, one or more of user agents 228, 230, 232 may be invited to join the session.

The focus server 206 may be further coupled to a data management server (DMS) 212. In this exemplary embodiment of the present invention, the focus server 206 may delegate the invitations requests and signals to the DMS 212. In optional embodiments of the present invention, the DMS 212 may be integrated within the focus server 206.

In this embodiment, the DMS 212 may be configured to gather and construct persisted data associated with each users identity, and managed by Internet servers. Such data may be collected directly from the user, for example when signed in through their user agent 202, or may be gathered by other means and updated by software processes. The context may include individual context 214 (IC) that is specific to each organization the consumer has interacted with and a single individual profile 216 (IP) that spans the interactions within different organizations. The DMS 212 may store, maintain various data records in a plurality of forms, and mediate access to records. For example, the data records may be represented in any number of ways, such as database records that may be accessed by query, a serialized format in text or binary, that is stored in a file system or transmitted on a network, or an object model that is accessed through code. Each of the data records may be versioned (as a whole and/or assigned to various parts) so that they may be cached or replicated, in whole or in part. Optimistic concurrency techniques may be applied to reads and writes of the data records. In an optional embodiment of the present invention, since it is not necessary for routing logic 224 to act based on the most updated data records, longer revalidation intervals may be used when there is little detriment to less recent data records. Further, revalidation may occur asynchronously, after using a cached data record.

In this exemplary embodiment, each user identity may have a single individual profile 216. The profile may contain data including but not limited to: demographic data, preferences and interests, financial info, such as: online wallet with payment instruments, credit rating, cumulative spend history, other personal information Each user may have multiple individual context records 214, one for each organization 210 they have contacted. For example, each individual context record may contain data including but not limited to: customer identifier(s) that may be used as foreign keys into the organization's customer database, history of past contacts with that organization, any ratings or favorites of that organization, history of past purchases with that organization, other data the organization would like to record in the IC 214 for future use.

Like each user, each organization may have an organization profile record (or "OP") 218. Each organizational profile may contain data including but not limited to: entity registration info, such as the entity's principal business address, link to the organization's website, business accreditations and ratings, categories of product/services bought, categories of product/services sold, and the like.

Further, each organization 210 may have organization context records 220, e.g., one for every other organization that has been contacted by any individual affiliated with that organization. Each organization context record (or "OC") 220 may contain data including but not limited to: organization identifier(s) that may be used as foreign keys into the organization's customer database, the status/expiry of a nondisclosure agreement between the organizations 210, contact history between the organizations 210.

The data management server 212 may be further configured to mediate both read and write access to the aforementioned data records (214-220). When receiving a read request, the DMS 212 may restrict and transform the data that is provided to the organization being contacted. For example, in an exemplary embodiment, the initiating UA may have a credit rating in their OP 218. The DMS 212 may, according to the initiating individual's consent, provide the credit score to certain categories of organization, or provide it later once consent is established. When such a credit score is provided, the data DMS 212 may provide the raw score, or transform it in some way, such as mapping the score to one of a set of predetermined ranges that are meaningful to the organization receiving the OC 220, for example to route the individual the e optimal representative(s) and/or provide the information to the selected representative(s) of the organization 210. The DMS 212 may filter out data elements (another form of subset) when specified by Routing Server 222, for the sake of network and computation efficiency whenever those elements are known to be irrelevant to the routing logic 224. The DMS 212 may vary its response to the same query depending on the user, for example the DMS 212 may return different results to the focus server 206 then a query from another system.

The DMS 212 may be further configured to mediate write requests, which may be concurrent with the conference session, since the user may be concurrently involved in multiple conference sessions, or because updates are being performed outside of any conference sessions. The DMS 212 may use optimistic concurrency, where writes are accepted only if based on the same version number; or alternatively, the DMS 212 may accept writes out of order and reconcile any conflicts. The DMS 212 may also be configured to mediate which writers have permissions to change data elements. For example, the IC 214 and OC 220 are specific to communications with one organization that would usually have full write access. In contrast, the IP 216 and OP 218 are used across communications with many organizations, and thus may be subject to greater restrictions on write access by a single organization.

Referring still to FIG. 2, the DMS may be further coupled to the routing server 22, may be commutatively coupled to various routing logic 224. In an optional embodiment of the present invention, the routing server may comprise the routing logic 224 (i.e., the routing logic 224 may reside on the routing server 224). The routing server 222 is configured to take data record results from the DMS 212, and select and execute the appropriate routing logic 224 for the target organization. As a result of output directives from the routing logic 224, the routing server 222 may take a number of actions including but not limited to: querying the authentication server in step X-6 for a list of users meeting certain criteria, and pass them back to the routing server 222, fetching presence state for particular user(s) from the authentication server and to be passed back to the routing logic 224, directing the focus server 206 to invite a user from the organization to join the conferencing session, directing the focus server 206 to invite a user from the organization to join the conferencing session on a provisional basis, and directing the focus server 206 to finalize a provisionally invited user to join the conference, or be rejected from the conference (or ejected) if already joined. In an optional embodiment, the routing server 222 may be integrated within the focus server 206. In another alternative embodiment, some functionality of routing server 222 may be integrated within the presence management components of the authentication server 204.

In an exemplary embodiment of the present invention, the routing logic 224 may be configured to be customizable for each organization 210 that is contacted. In this circumstance, routing logic 224 is consulted by the routing server 222, when the routing server 222 interacts with the authentication server 204 to query user presence, as well as when the routing 222 server works with the focus server 206 to invite and join selected users.

In an exemplary embodiment of the present invention, the routing logic may be arbitrary code. Arbitrary code may be an engine that interprets declarative rules, or it may be an algorithm template with parameters set for each organization, for example a formula that scores each candidate user on a number of parameters, each weighted by a factor, and accumulated. Routing logic may be executed locally, remotely, or a combination thereof, for example simpler local logic that is executed and used if remote logic is unreachable or times out.

Initially, the routing logic 224 takes a number of inputs, including, the target username invited by the UA, which may be a particular user or an alias, data records (IP', IC, OP', OC) as restricted, transformed, and filtered by the DMS 212, other information conveyed by the initiating UA 202, for example a more recent location fix of the user than might be found in their presence state, the presence state of the organization's users, data from the organization's 210 directory, such as: Attributes such as department, cost center, title, level, and so forth, group memberships, reporting hierarchy, office location, other attributes of the organization's users, such as: certifications, awards, elite status, hours of training, ratings, etc. The routing logic 224 may use time elapsed since the request in order to keep computation time bounded, providing a balance between optimal results vs. keeping users waiting too long. The outputs of the routing logic 224 include directives to the routing server 222 such as: Query for user's presence, invite a user to join conference, possibly in a provisional state, finalize a provisionally invited user by either joining the user to the conference or ejecting the user.

The routing logic 224 may receive updates via the routing server 222 from the focus server 206 on the state of invited users joining the conference. Based on these updates, the routing logic 224 may issue additional directives to the routing server 222. The routing logic 224 determines when it has completed executing and will no longer generate additional directives for the invite request.

The routing logic 224 may specify which user agents 228-232 from the target organization should be invited. For example, the scenario may call for organizational agent 228-232 from a trainer group and two from a trainee group to join the conference. In another exemplary embodiment, the scenario may pair up two experts from different disciplines, as determined from the organization's directory, based on the initiating user's preferences, as expressed in their OC 220 data record.

Still referring to FIG. 2, a flow diagram (X-1 through X-9) illustrating an exemplary process for the execution of software in accordance with an embodiment of the present invention. The user may be prompted on a graphical user interface (GUI) to enter a user identification and password and may also be prompted to create an account Non-limiting examples of GUIs include computer monitor, cell phone display and television.

The sequence shown in FIG. 2 need not be strictly serialized according to the step number. It is to be appreciated that a skilled artisan may rearrange or reorder the steps while maintaining like results.

Each step involves one or more data exchanges. When directional arrows are used within the diagram, they depict the initiator of the data exchange on the tail-side of the arrow. Data may flow in the opposite direction, providing tokens, and acknowledgements. Requests may be asynchronously transmitted, such as through polling or queues, for example. Responses may arrive asynchronously through direct calls, queues, or polling for example. Requests and responses may be batched.

At step X-1, at least one user, through the UA 202, will sign in to the authentication server 204 prior to joining or creating a conference. The UA's sign-in information may be used to locate the user's data records.

At step X-2, a UA may create a new conference session or join an existing conference session with the focus server 206. Other UAs, whether anonymous or signed-in, may join using a valid conference key that was delivered by another means, such as advance email. Such UAs joining the conference may not be subject to the remaining steps described, and may occur at any time concurrently with those steps being executed. Any authorized UA may also request the focus server 206 to bridge with anonymous users (such as dial-out to a phone number) as described earlier. Such invitations of anonymous users may occur at any time, concurrently with the remaining steps being executed.

At Step X-3, at any point during the conference, a signed-in user joined to the conference may invite a user who is associated with a primary organization. Unlike the aforementioned circumstances where users directly contact the focus server 206 or anonymous users are bridged into the focus server 206, inviting may trigger a chain of decisions and events that is further described in the remaining flow steps X-4 through X-8. The user identity requested by the requesting may be referred to as the initial target. The user identity may be a user, an alias for a user, or a distribution list alias for a group.

At step X-4, the focus server 206 first determines the organization for both the initiating user and initial target. This determination may be done in a number ways. Non-limiting examples may include parsing the username to find a domain name, or by consulting presence data or other sources. The focus server 206 may then request data records from the DMS 212, specifically the IP 216 and IC 214 records for the initiating user, the OC 220 and OP 218 records for the initiating user's organization, and the OP 218 for the initial target's organization.

If the focus server 206 finds no OC 220 or OP 218 records for the initial target (e.g., because the account belongs to an independent consumer or the organization has opted not to make use of advanced routing) it may bypass step X-5 and X-6. In step X-7 the focus server 206 may query the authentication server 204 in an attempt to locate one or more UAs signed in for the initial target organization. In step X-8, the "optimized match" UA is invited to join the conference session. In an exemplary embodiment, the focus server 206 may determine from data elements in the initial target's OP 218 or the initiating user's IP, IC, OP, or OC 214-220 records to similarly skip step X-5 and X-6.

Within the conference session, multiple advanced routings (ARs) may be executed concurrently when more than one organization is invited to join the conference, however there may be only one pending AR per target organization for a given conference session. If the focus server 206 determines that an AR is already pending for the conference session, the later incoming AR request may be terminated and the target username may be invited to join by steps X-7 and X-8.

At step X-5, the DMS 212 passes the (possibly via the FS 206) the transformed Data Records (IP', IC', OP', OC') to the RS 222, along with information including the target username requested, and any other parameters added by the FS 206, such as additional parameters sent along with the invite from the initiating UA 202 to the FS 206. During an AR, the user(s) already joined to the conference session may be have their UAs directed by the focus server 206 to show information that is specified by the target organization, such as a company branding, advertisements, announcements or welcome messages.

Starting with step X-6, the routing server 222 begins to identify users that the focus server 206 should invite to join the conference. If at any point during this process, the AR may be terminated due to timeouts as determined by the focus server 206, or the focus server 206 receiving a status code from the routing server 222 indicating an abnormal termination. In the case that the AR is terminated, the focus server 206 proceeds to step X-7 and X-8, the same as if step X-5 was never started.

Based on the information provided, the routing logic 224 will determine one or more users to get more information about, and ultimately invite one or more users to the conference, before the AR is successfully terminated. As events occur, including but not limited to the presence information becoming known, users joining the conference, passage of time, the routing logic 224 may continue to add or remove users from the candidate list.

At step X-6, the routing server 222 may query the authentication server 204 for presence data of the usernames of interest. The routing server 222 may request presence information about a number of users within the target organization. This presence data may be used to refine the decision whether or not to invite such users to the conference. In order to improve speed and reduce overall load on the authentication servers 204, presence info may be cached by the routing server 222.

Step X-7 may be used when AR has not been started or has been terminated unsuccessfully. The focus server 206 queries the authentication server 204 to find the "optimized match" UA(s) for the target username, then proceeds to step X-8 to invite the UA(s) to join the conference.

At step X-8, when directed by the routing logic 224, the routing server 222 may have the focus server 206 issue conference invites to a user. The user may have multiple UAs that are signed in with the authentication server 206. When there is more than one UA, the process of inviting the appropriate UA(s) is handled according to that organization's rules for that user. For example, some users may have multiple UA tried in series, other have them tried in parallel, and yet others may when on vacation redirect to another user.

When the UA receives the invite, it may ask the user for permission to contact the FS 206 and join the conference. The target user may be given some information about the initiating user, for example pulling up some history of past contacts or referencing the organization's database using the individual's identifier. The target user may then decide whether to accept, reject, ignore, or redirect the request.

While a number of target users are identified as available, this information may be communicated to the focus server 206 and used by the routing server 222 to determine whether to further add or reduce to the list of users from the target organization.

In an exemplary embodiment, the UA of a selected target user may also join the focus server 206 in a provisional state, awaiting a final decision from the routing server 222 on whether he should actually join the conference. The RS 222 may make a final determination of which user(s) from the target organization will be joined to the conference. The focus server 206 may disconnect any target users who are de-selected, whether they are waiting to join the conference, have been provisionally joined, or have already joined. For finally selected users in the organization, UAs who are awaiting to join may be added to the conference, and those provisionally joined are promoted to fully join the conference and become eligible to participate in the conference.

In optional embodiments of the present invention, media may flow directly between UAs.

The system architecture described above has a myriad of uses, examples of which will be described in greater detail below. The uses may comprise certain methods, which, when coupled to the system architecture have many distinct advantages over known systems and methods.

The methods may further comprise the use of Location Based Services (LBS) Technology which tracks geographical positioning via mobile devices and networks; near Field Communication (NFC) which allows for small data packet transfers and is being used by new mobile apps, for making instant payments via mobile devices, and for merchant push/pull marketing; and Quick Response Code/Tag (QRs).

The systems and methods in exemplary embodiments provide a streamlined interface for retail salespeople, which turns them into online "personal shoppers." This feature will let salespeople rapidly search their inventory, locate and present the consumer with product options which match their needs (through telephone, audio, video, chat, text, etc.), and "push" these products into the customer's screen for quick review and selection, thereby speeding purchase decisions and improving the customer experience.

In an exemplary embodiment, once a customer's profile data (credit card, billing/shipping address, etc.) are part of the merchant's system, they can simply approve the items presented to them by the personal sales agent and express their desired method of delivery, either to be picked up or shipped. The salesperson can take care of the rest. The entire process could be accomplished with no "clicks," no "searching/browsing" and while strolling along with a hand held tablet, mobile phone or other device In other exemplary embodiments, Audio/Video Integration consumers will be able to connect with salespeople in real-time, initiating a highly personalized shopping experience directly from their iPad, Mobile Phone, or other mobile device. This feature will improve the online consumer experience, by connecting them to a real salesperson that can assist them with their products and services. This technology leverages the knowledge of sales personnel, by providing an environment which better utilizes their experience, skill specialization, etc. and creates a frictionless consumer experience. Further embodiments may comprise mobile advertising and promotion apps.

The following examples are for illustrative purposes only, and are not meant to limit the scope of the invention.

Example 1

User needs a new sofa but doesn't have time to go furniture shopping. He opens his Open4Sale App on his iPad. In one tap he sees a list of furniture merchants: Ethan Allen, Macy's, Wickes, LazyBoy. He taps the Macy's icon. Instantly, he's connected to a Macy's sales rep Merchant, whose image appears on the screen Merchant: "Hi User. Thanks for choosing Macy's how may I assist you today?"

User: "Hi Merchant, I'm looking for an L-shaped sofa in cream or light blue" I want something soft and durable, maybe in ultra-suede, for under $1000.00."

Merchant: "Sure User, I've found 6 sofas which may work for you. Here, take a look."

Instantly, a store shelf appears next to Merchant's image (which smoothly reduces down). On the shelf appear six images of sofas matching User's description.

User: "Can I take a closer look at the 'Keira' and the 'Sawyer'"?

Merchant: "Sure, User here you go"

Instantly the unwanted items disappear and larger images of the 2 sofas appear. User: "I really like the Sawyer set, but I'd like to see it from different angles" Merchant: "Okay, one second".

Merchant undocks her Merchant iPad, walks over to the model on the floor and shares the video with User in real time.

User: "That looks perfect and it's on sale! Can I have it scotch-guarded and delivered by next Monday?

User: Please.

Merchant: Would you like me use the credit card and address on file?

User: Yes.

Merchant: "Okay, your purchase is confirmed You will receive shipping/tracking information in a few minutes. Is there anything else I can help you with today?"

User: "I'm good Thank s Merchant Have a great day!"

Example 2

Merchant is browsing a J. Crew catalog she just got in the mail. She sees a dress which she thinks might be perfect for her upcoming party, but it's kind of expensive, so she wants more information before making a decision.

Using her Mobile Phone, she opens her app which houses the software and firmware described herein, and snaps the QR code next to the product. Seconds later, Julie, a J. Crew salesperson appears on the screen, asking how she can help (Salesperson can already see the dress stored in the QR code, as well as the customer's information from her profile).

Salesperson: "Hi User: I see you are looking at the Cashmere Tee Dress. How may I help you?" User: "I really like this, but it's kind of pricey, so I just want to make sure I love it!

Salesperson: "Okay. Here are some other images of the dress. I also have a video I can send you. What color are you thinking about?

User: "I can't decide between the dark poppy and the heather gray".

Salesperson: "Okay, here are the images and video with those colors. Here are some reviews too."

Merchant can now see the images and video and optionally use her fingers to rotate the images and scroll through reviews.

User: "I really like the dark poppy Does it look exactly like the picture? Also, are you offering any specials now?"

Salesperson: "Let me check Yes, it looks exactly like the picture" Also, I see that you've earned a 10% discount".

User: "Great! I have a function in 2 days Can I get it shipped overnight?"

Salesperson: "Absolutely! Shall I charge the card you have on file with O4S, and ship it to the same address?"

User: "Yes, please".

Salesperson: "Okay, you're all set It will be there by 10:30 AM tomorrow. You'll get your tracking information in a few minutes. Anything else I can help you with today?

User: "No that's perfect Thank you so much!" Merchant taps an "options" icon, whilst unobtrusively on the bottom of her screen, and gives Sales person a 5 star service rating.

Example 3

Buyer is a looking to buy a new pickup truck. While out getting a cup of coffee and sees his dream truck parked in the lot. He snaps a picture of it with his mobile phone and sends it, using his special Open4Sale interface to the nearest Ford dealer. Before sending, however, speaks into his phone, adding: "I'm looking for this truck! I want a 2011 model in black with beige leather trim, a 6-disk CD changer and GPS system, I'm looking to buy within 30 days. The audio comments are recorded and sent, along with the photo to the dealer.

14 minutes later, Salesman from Ford, pings Buyer and, approving the call from his Open4Sale interface, Salesman appears on the screen, alongside a picture of Buyer's coveted truck! Salesman is walking around the truck on his lot with his iPad, transmitting video of the exterior and interior. Under the images appear the year, list price, offer price, gas mileage and other vehicle details.

Buyer can barely contain his excitement. He asks Salesman if he can do any better on the price. Salesman shoots him over a price comparison list he prepared in advance for similar vehicles, which explains why this is the best price he can offer.

Salesman: "Larry, I can honestly tell you this is the hottest pickup on our lot, and it won't last long! I can put a hold on it for you right now for $500 and schedule a test drive within 1 week."

Buyer: "That's great Can you use the card I have on file with O4S? I'd like to come test drive it tomorrow".

Salesman: "Okay, so I have your permission to charge your card listed on your profile?" Buyer: "Yes!".

Salesman: "Okay, your deposit has been approved. The truck will be here waiting for you tomorrow! I'll be here from 9-5"

Buyer: "Awesome! I'll see you tomorrow morning"

Example 4

Buyer is watching her show on TV and a commercial comes on advertising the latest cross trainer from Nike. Taking her phone (equipped with NFC) chip she opens the Open4sale app and taps receive.

She opens the Open4Sale app and taps "RECEIVE" She holds the phone up to the TV and in seconds Nike sales rep, Merchant, appears on the other end:

Merchant: "Hi Buyer, this is Merchant I see you're interested in the new Nike Z12 Cross-Trainer. Is that right?"

Buyer: "Hi Merchant Yes, I'm wondering what colors they come in?"

Merchant: "No problem If you look on your screen, I've already sent you all the colors we offer" Buyer: "Wow! Hmm I like the powder blue one and the pink one How are the reviews?" Merchant: "I'm sending them to you now. As you can see it has a 4.8 out of 5 rating People really love this shoe!"

Buyer: "They sure do! Okay, I'd like a pair in blue and pink, in a size 6. Go ahead and use my O4S info Regular shipping is fine"

Looking at her profile, Merchant notices that Buyer is an avid swimmer.

Merchant: "Okay, by the way, I see on your profile that you're a swimmer I've just sent you some pictures of our new athletic swimsuits we just got in they're not even in the catalog yet! Let me know if you're interested".

Buyer: "Hmmm, I really do need some new suits Wow those are so cute! Okay, I'll take one in black and, what the hell, go ahead and give me a blue one too I'm a size 4"

Merchant: "You got it Okay, you're all set Your order comes to $248 22, including tax and shipping. Do I have your approval to charge your card on file?" Buyer: "Yes, thank you".

Merchant: "Okay, your order's been processed You'll receive your shipping/tracking information shortly Thank you for shopping with Nike!".

Buyer clicks her "Options" icon and gives Merchant a great rating. She also forwards pictures of these products to her friends and family. After her package arrives, she is reminded by O4S to rate her products.

In any of the examples listed above, multi-party video is contemplated, along with recording/archiving, salesperson Request/Queue Ability for consumer to connect to merchant, and request a specific salesperson.

Each of the purchases made can be single click on the real item itself, which his shown in the video in real-time.

Specific configurations and arrangements of the invention, discussed above with reference to the accompanying drawing, are for illustrative purposes only. Other configurations and arrangements that are within the purview of a skilled artisan can be made, used, or sold without departing from the spirit and scope of the invention. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

The order or sequence of any process or method steps may be varied or re-sequenced according to alternative embodiments. Other substitutions, modifications, changes and omissions may be made in the design, operating conditions and arrangement of the embodiments without departing from the spirit and scope of the methods and systems described herein.

We claim:

1. A system for signal or data routing, the system comprising:

a client side graphical user interface GUI in communication with target side GUI over a network; wherein the client side GUI represents a first user and the target side GUI represents an organizational user;

a focus server communicatively coupled to the client side GUI and the target side GUI, wherein the focus server is configured to create a conference session between the client side GUI and the target side GUI, a routing server comprising various routing logic, configured to direct the focus server to invite the organizational user to join the conference session at the target side GUI, a data management server coupled to the routing server, configured to store, maintain various data records comprising a single individual profile and a plurality of individual context records for a user, and an organization profile record and organization context records for an organization, wherein the routing server is configured to:

take data record results from the data management server, and select and execute an appropriate routing logic for a target organization;

query an authentication server for a list or a group of users who meet predetermined criteria, and pass the list or the group of users back to the routing server;

fetch a presence state for one of particular users of the group from the authentication server;

pass back the presence state to the routing server to direct the focus server to invite a user from the organization to join the conference session on a provisional basis, and direct the focus server to finalize a provisionally invited user to join the conference session, or be rejected from the conference session or ejected if already joined.

2. The system of claim 1, wherein the focus server is further configured to:

receive join requests from the client side GUI who have received an invitation or other token that permits joining the session; and query the presence state of a user and then be communicatively coupled with one or more of organizational users.

3. The system of claim 1, wherein the data management server is further configured to mediate both read and write access to data records.

4. A method of signal and data routing, the method comprising:

providing a client side graphical user interface GUI in communication with target side GUI over a network; wherein the client side GUI represents a first user and the target side GUI represents an organizational user;

creating a conference session using a focus server communicatively coupled to the client side GUI and the target side GUI, wherein the focus server is configured to create a conference session between the client side GUI and the target side GUI;

directing, by a routing server comprising various routing logic, the focus server to invite the organizational user to join the conference session at the target side GUI;

storing and maintaining, by a data management server coupled to the routing server, various data records comprising a single individual profile and a plurality of individual context records for a user, and an organization profile record and organization context records for an organization;

taking, by the routing server, data record results from the data management server, and selecting and executing an appropriate routing logic for a target organization;

querying, using the routing server, an authentication server for a list or a group users who meet predetermined criteria, and pass the list or the group of users back to the routing server;

fetching a presence state for one of particular users of the group from the authentication server;

passing back the presence state to the routing server to direct the focus server to invite a user from the organization to join the conference session on a provisional basis; and directing the focus server to finalize a provisionally invited user to join the conference session, or be rejected from the conference session or ejected if already joined.

5. The method of claim 4, further comprising:

receiving, by the focus server, join requests from the client side GUI who have received an invitation or other token that permits joining the session; and querying, by the focus server, the presence state of that a user and then be communicatively coupled with one or more of organizational users.

6. The method of claim 4, further comprising mediating both read and write access to data records with the data management server.

7. The method of claim 4, wherein the routing server is configured to be customizable for each organization that is contacted.

* * * * *